United States Patent
Thorne et al.

(10) Patent No.: US 9,486,919 B1
(45) Date of Patent: Nov. 8, 2016

(54) DUAL-AXIS ROBOTIC JOINT

(71) Applicant: Google Inc., Mountain View, CA (US)

(72) Inventors: Christopher Everett Thorne, Mountain View, CA (US); Michael Patrick Murphy, Mountain View, CA (US)

(73) Assignee: Google Inc., Mountain View, CA (US)

( * ) Notice: Subject to any disclaimer, the term of this patent is extended or adjusted under 35 U.S.C. 154(b) by 161 days.

(21) Appl. No.: 14/458,365

(22) Filed: Aug. 13, 2014

(51) Int. Cl.
*B25J 9/16* (2006.01)
*B25J 9/10* (2006.01)
*B25J 9/18* (2006.01)
*A61F 2/64* (2006.01)

(52) U.S. Cl.
CPC .............. *B25J 9/1633* (2013.01); *B25J 9/1075* (2013.01)

(58) Field of Classification Search
CPC ........ B25J 5/007; B25J 9/0006; B25J 9/042; B25J 9/044; B25J 9/046; B25J 9/047; B25J 9/104; B25J 9/106; B25J 9/1065; B25J 9/1075; B25J 9/123; B25J 9/126; B25J 9/142; B25J 9/144; B25J 9/1623; B25J 9/1633; B25J 15/0213; B25J 15/0246; B25J 17/025; B25J 17/0275; B25J 19/0016; B25J 19/0075; H01L 21/67739; H01L 21/67742; Y02T 10/84
See application file for complete search history.

(56) References Cited

U.S. PATENT DOCUMENTS

| 6,428,266 | B1 | 8/2002 | Solomon |
| 6,658,962 | B1 | 12/2003 | Rosheim |
| 7,367,245 | B2 | 5/2008 | Okazaki |
| 2010/0243344 | A1 | 9/2010 | Wyrobek |
| 2012/0045308 | A1 | 2/2012 | Kremerman |
| 2012/0283845 | A1* | 11/2012 | Herr .......................... A61F 2/66 623/24 |
| 2015/0051527 | A1* | 2/2015 | Potter .................. A61F 5/0125 602/16 |
| 2015/0209214 | A1* | 7/2015 | Herr ......................... A61H 3/00 623/27 |
| 2015/0272811 | A1* | 10/2015 | Choi ....................... B25J 17/00 623/27 |

FOREIGN PATENT DOCUMENTS

| JP | 2000237985 A | * | 9/2000 |
| JP | 2006341336 A | * | 12/2006 |
| WO | 2008030419 | | 3/2008 |

* cited by examiner

*Primary Examiner* — Dale Moyer
(74) *Attorney, Agent, or Firm* — McDonnell Boehnen Hulbert & Berghoff LLP

(57) ABSTRACT

Example joints for a robotic device are provided. An example robotic joint may include an upper portion, a lower portion, and a connecting link positioned between the upper portion and the lower portion. The upper portion may be coupled to the connecting link via a first revolute joint, and the lower portion may be coupled to the connecting link via a second revolute joint. The robotic joint may also include an actuator having a first end coupled to the upper portion and a second end coupled to the connecting link, where the actuator is configured to apply a torque to the connecting link. The robotic joint may also include a coupling element configured to transfer the torque applied to the connecting link into a rotational motion of the lower portion about the second revolute joint.

20 Claims, 10 Drawing Sheets

DUAL-AXIS ROBOTIC JOINT

GOVERNMENT RIGHTS

This invention was made with U.S. Government support under Contract No. W911QX-12-C-0085 awarded by DARPA. The Government may have certain rights with regard to the invention.

BACKGROUND

Unless otherwise indicated herein, the materials described in this section are not prior art to the claims in this application and are not admitted to be prior art by inclusion in this section.

A robotic device includes a mechanical agent, usually an electro-mechanical machine that is guided by a computer program or electronic circuitry. Robots can be autonomous or semi-autonomous and range from humanoid designs, to large industrial designs with jointed arms and end effectors to perform specialized tasks.

Such robotic devices may include several joints configured to enable the robotic device to perform a variety of functions and movements. For example, a humanoid robotic device may include knee joints, elbow joints, and finger joints. In some example operations, such joints of a robotic device may need a relatively large range of motion and constant ratio of angular velocities between joint components to perform desired functions.

SUMMARY

The present application discloses embodiments that relate to robotic joints for various robotic devices. In one example, the present application describes robotic joint including an upper portion, a lower portion, and a connecting link positioned between the upper portion and the lower portion. The upper portion may be coupled to the connecting link via a first revolute joint, and the lower portion may be coupled to the connecting link via a second revolute joint. The robotic joint may also include an actuator system having a first end coupled to the upper portion and a second end coupled to the connecting link, where the actuator system is configured to apply a torque to the connecting link such that the torque applies a rotational motion of the connecting link about the first revolute joint. The robotic joint may also include a coupling element configured to transfer the torque applied to the connecting link into a rotational motion of the lower portion about the second revolute joint. A ratio of an angular velocity of the connecting link about the first revolute joint and an angular velocity of the lower portion about the second revolute joint may be constant across a range of the robotic joint.

In another aspect, the present application discloses a robotic device. The robotic device may include a body, and one or more joints coupled to the body. The one or more joints may include an upper portion, a lower portion, and a connecting link positioned between the upper portion and the lower portion. The upper portion may be coupled to the connecting link via a first revolute joint, and the lower portion may be coupled to the connecting link via a second revolute joint. The one or more joints may also include a linear actuator having a first end coupled to the upper portion and a second end coupled to the connecting link, where the actuator system is configured to apply a torque to the connecting link such that the torque applies a rotational motion of the connecting link about the first revolute joint. The one or more joints may also include a coupling element configured to transfer the torque applied to the connecting link into a rotational motion of the lower portion about the second revolute joint. A ratio of an angular velocity of the connecting link about the first revolute joint and an angular velocity of the lower portion about the second revolute joint may be constant across a range of the robotic joint. The robotic device may also include a load cell provided proximal to a given joint of the one or more joints for detecting a force applied to the robotic device and the torque applied to the connecting link. The robotic device may also include a controller programmable to determine a location of the detected force along the robotic device based on values of the force and the torque output from the load cell and responsively cause the linear actuator to adjust the torque applied to the connecting link based on the determined location of the detected force.

In another aspect, the present application another robotic joint, including an upper portion, a lower portion, and a connecting link positioned between the upper portion and the lower portion. The connecting link may include a first cam surface and a second cam surface. The upper portion may be coupled to the connecting link via a first revolute joint, and the lower portion may be coupled to the connecting link via a second revolute joint. The robotic joint may also include a first actuator coupled to the upper portion, where the first actuator is configured to contact the first cam surface to apply a first torque to the connecting link such that the first torque applies a rotational motion of the connecting link about the first revolute joint in a first direction. The robotic joint may also include a second actuator coupled to the upper portion, where the second actuator is configured to contact the second cam surface to apply a second torque to the connecting link such that the second torque applies a rotational motion of the connecting link about the first revolute joint in a second direction. The robotic joint may also include a coupling element configured to transfer the torque applied to the connecting link into a rotational motion of the lower portion about the second revolute joint. A ratio of an angular velocity of the connecting link about the first revolute joint and an angular velocity of the lower portion about the second revolute joint may be constant across a range of the robotic joint.

In another aspect, the present application describes robotic joint including an upper portion, a lower portion, and a connecting link positioned between the upper portion and the lower portion. The upper portion may be coupled to the connecting link via a first revolute joint, and the lower portion may be coupled to the connecting link via a second revolute joint. The robotic joint may also include an actuator system having a first end coupled to the lower portion and a second end coupled to the connecting link, where the actuator system is configured to apply a torque to the connecting link such that the torque applies a rotational motion of the connecting link about the second revolute joint. The robotic joint may also include a coupling element configured to transfer the torque applied to the connecting link into a rotational motion of the upper portion about the first revolute joint. A ratio of an angular velocity of the connecting link about the first revolute joint and an angular velocity of the lower portion about the second revolute joint may be constant across a range of the robotic joint.

In yet another aspect, the present application another robotic joint, including an upper portion, a lower portion, and a connecting link positioned between the upper portion and the lower portion. The connecting link may include a first cam surface and a second cam surface. The upper portion may be coupled to the connecting link via a first revolute joint, and the lower portion may be coupled to the connecting link via a second revolute joint. The robotic joint may also include a first actuator coupled to the lower portion, where the first actuator is configured to contact the first cam surface to apply a first torque to the connecting link such that the first torque applies a rotational motion of the connecting link about the second revolute joint in a first direction. The robotic joint may also include a second actuator coupled to the lower portion, where the second actuator is configured to contact the second cam surface to apply a second torque to the connecting link such that the second torque applies a rotational motion of the connecting link about the second revolute joint in a second direction. The robotic joint may also include a coupling element configured to transfer the torque applied to the connecting link into a rotational motion of the upper portion about the first revolute joint. A ratio of an angular velocity of the connecting link about the first revolute joint and an angular velocity of the lower portion about the second revolute joint may be constant across a range of the robotic joint.

In still other examples, methods and computer program products including instructions executable by a device, or by one or more processors or other components of the device, to perform functions of the methods are provided. The methods may be executable for operating a robotic device, for example.

These as well as other aspects, advantages, and alternatives, will become apparent to those of ordinary skill in the art by reading the following detailed description, with reference where appropriate to the accompanying figures.

DETAILED DESCRIPTION

Figure 1:
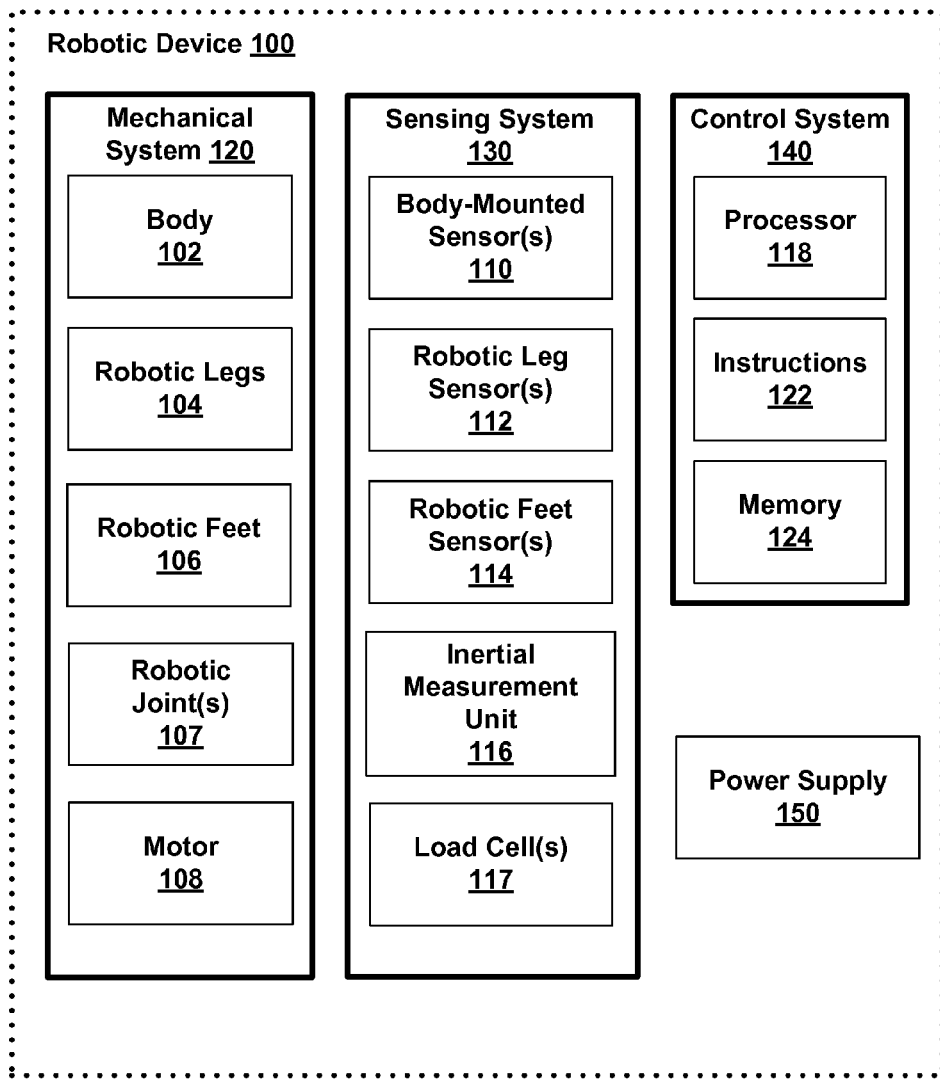
FIG. 1 is a functional block diagram illustrating a robotic device, according to an example embodiment.

Example methods and systems are described herein. It should be understood that the words "example," "exemplary," and "illustrative" are used herein to mean "serving as an example, instance, or illustration." Any embodiment or feature described herein as being an "example," being "exemplary," or being "illustrative" is not necessarily to be construed as preferred or advantageous over other embodiments or features. The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

Robotic devices may include several joints configured to enable the robotic device to perform a variety of functions and movements. For example, a robotic device may include knee joints, elbow joints, and finger joints. In some example operations, such joints of a robotic device may need a large range of motion and constant ratio of angular velocities between joint components. Example linkages for use in a joint of a robotic device are described herein to accomplish such goals.

An example robotic joint may include an upper portion coupled to a lower portion via a connecting link. The upper portion may be coupled to the connecting link via a first revolute joint, and the lower portion may be coupled to the connecting link via a second revolute joint. The robotic joint may also include an actuator coupled to the connecting link. The actuator may be configured to apply a torque to the connecting link such that the torque applies a rotational motion of the connecting link about the first revolute joint. The linkage may also include a coupling element configured to transfer the torque applied to the connecting link into a rotational motion of the lower portion about the second revolute joint. The coupling element may include tensile elements that crisscross across the joint, or a plurality of gear teeth on the upper portion configured to interact with a plurality of gear teeth on the lower portion, as examples.

Such a configuration enables the robotic joint to have a range of motion of approximately one hundred and eighty degrees. Further, the ratio of an angular velocity of the connecting link about the first revolute joint and an angular velocity of the lower portion about the second revolute joint is constant across the motion of the joint, meaning a similar input at any joint angle results in a similar output. A constant ratio of angular velocities between joint components enables the actuator to be sized reasonably for a particular use case. In addition, the axis of rotation of the joint may be in line with the center line of the two revolute joints. Such a configuration enables the upper portion and the lower portion to line up when fully extended, and fold up completely when the joint is at full bend.

Further, the configuration of the dual-axis joint described above enables cables, hoses, wire-ropes or other elements to pass through the joint with no length change. In other words, the length of the cables will not change as the joint angle changes. Such a configuration enables electrical components, cables, hoses, and other elements to pass through active joints without being coupled to them. Further, the cables and other elements may be consistently taught since their length does not change, making the sizing of such elements easier and more efficient. In addition, cable driven joints on the distal side of the dual-axis joint may have actuators on the proximal side of the joint without the dual-axis joint introducing any motion to the cable driven joint.

It should be understood that the above examples are provided for illustrative purposes, and should not be construed as limiting. As such, the method may additionally or alternatively includes other features or includes fewer features, without departing from the scope of the invention.

Referring now to the figures, FIG. 1 illustrates a functional block diagram illustrating a robotic device 100, according to an example embodiment. The robotic device 100 may include various subsystems such as a mechanical system 120, a sensing system 130, a control system 140, as well as a power supply 150. The robotic device 100 may include more or fewer subsystems and each subsystem could include multiple elements. Further, each of the subsystems and elements of robotic device 100 could be interconnected. Thus, one or more of the described functions of the robotic device 100 may be divided up into additional functional or physical components, or combined into fewer functional or physical components. In some further examples, additional functional and/or physical components may be added to the examples illustrated by FIG. 1.

The mechanical system 120 may include several components, including a body 102, one or more robotic legs 104, and one or more robotic feet 106 coupled to the one or more robotic legs 104. The mechanical system 120 may also include one or more robotic joints 107, configured to enable the robotic device to perform a variety of functions and movements, as discussed in more detail below. The mechanical system 120 may additionally include a motor 108, which may be an electric motor powered by electrical power, or may be powered by a number of different energy sources, such as a gas-based fuel or solar power. Additionally, motor 108 may be configured to receive power from power supply 150. The power supply 150 may provide power to various components of robotic device 100 and could represent, for example, a rechargeable lithium-ion or lead-acid battery. In an example embodiment, one or more banks of such batteries could be configured to provide electrical power. Other power supply materials and types are also possible.

The sensing system 130 may determine information about the environment that can be used by control system 140 (e.g., a computing device running motion planning software). The control system 140 could be located on the robotic device 100 or could be in remote communication with the robotic device 100. In one particular example, the sensing system 130 may use one or more body-mounted sensors 110 attached to the body 102 of the robotic device 100, which may be 2D sensors and/or 3D depth sensors that sense information about the environment as the robotic device 100 moves. For example, the body-mounted sensors 110 may determine a distance between the body 102 of the robotic device 100 and the ground surface on which the robotic device 100 operates. In further examples, one or more robotic leg sensors 112 may be located on the robotic legs 104 of the robotic device 100. The robotic leg sensors 112 may be contact sensors configured to alert the robotic device when the robotic legs 104 are in contact with the ground surface. In another example, the robotic legs 104 may be coupled to robotic feet 106 that contact the ground surface. In such a case, the robotic device 100 may include one or more robotic feet sensors 114 positioned on the robotic feet 106 of the robotic device 100. The robotic feet sensors 114 may be contact sensors configured to alert the robotic device 100 when the robotic feet 106 are in contact with the ground surface.

The sensing system 130 may further include an inertial measurement unit (IMU) 116. In an illustrative embodiment, IMU 116 may include both an accelerometer and a gyroscope, which may be used together to determine the orientation, position, and/or velocity of the robotic device 100. In particular, the accelerometer can measure the orientation of the robotic device 100 with respect to gravity, while the gyroscope measures the rate of rotation around an axis. IMUs are commercially available in low-cost, low-power packages. For instance, an IMU 116 may take the form of or include a miniaturized MicroElectroMechanical System (MEMS) or a NanoElectroMechanical System (NEMS). Other types of IMUs may also be utilized. The IMU 116 may include other sensors, in addition to accelerometers and gyroscopes, which may help to better determine position and/or help to increase autonomy of the robotic device 100. Two examples of such sensors are magnetometers and pressure sensors. Other examples are also possible.

The sensing system may further include one or more load cells 117. Load cells 117 may be provided at all of the robotic joints 107 of the robotic device 100, or at selected joints such as an elbow joint, for example. Example load cells 117 may include a multi-axis load cell that includes strain gauges on multiple surfaces to sense forces along multiple axes. Urethane (or other rubber, plastic, epoxy material) may be included surrounding the load cell to enable an applied force to be sensed by the strain gauges.

An example load cell 117 may be internal to an actuator of the robotic joint 107 and coupled between the actuator 102 and the robotic joint 107, provided on the actuator, or provided on the robotic joint 107. The load cell 117 may further be a component internal of the joint 107. The load cell 117 may include a transducer to detect and convert an applied force to the robotic manipulator into an electrical signal. For example, a force being sensed deforms a strain gauge of the load cell 117, and the strain gauge measures the deformation (strain) as an electrical signal because the strain changes an effective electrical resistance of the gauge. The load cell 116 may include four strain gauges in a Wheatstone bridge configuration, one strain gauge in a quarter-bridge configuration, or two strain gauges in a half-bridge configuration. The electrical signal output may be in the order of a few millivolts and may be amplified as well.

Many or all of the functions of the robotic device 100 could be controlled by control system 140. Control system 140 may include at least one processor 118 (which could include at least one microprocessor) that executes instructions 122 stored in a non-transitory computer readable medium, such as the memory 124. The control system 140 may also represent a plurality of computing devices that may serve to control individual components or subsystems of the robotic device 100 in a distributed fashion.

In some embodiments, memory 124 may contain instructions 122 (e.g., program logic) executable by the processor 118 to execute various functions of robotic device 100, including those described below. Memory 124 may contain additional instructions as well, including instructions to transmit data to, receive data from, interact with, and/or control one or more of the mechanical system 120, the sensor system 130, and/or the control system 140.

Figure 2A:
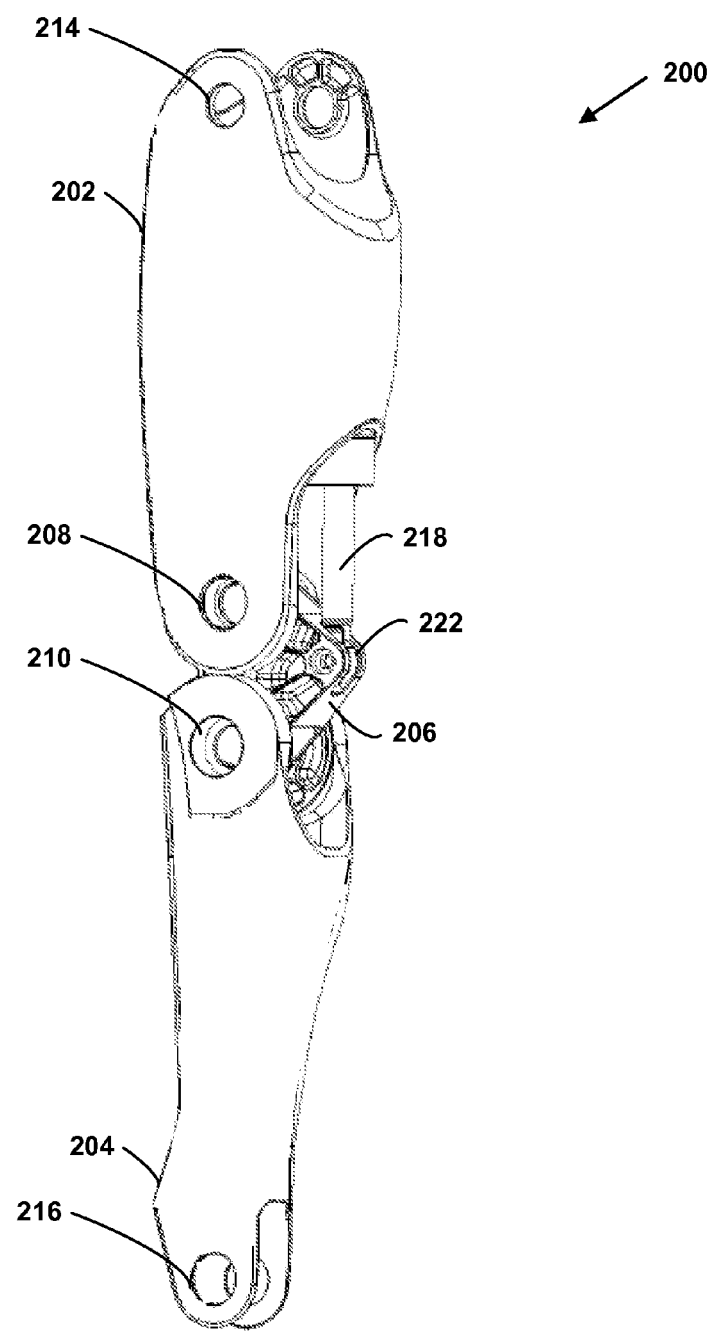
FIG. 2A illustrates an example robotic joint, in accordance with at least some embodiments described herein.

As described above, robotic devices may include several joints configured to enable the robotic device to perform a variety of functions and movements. For example, a robotic device may include knee joints, elbow joints, and finger joints. FIG. 2A illustrates an example robotic joint 200, according to an example embodiment. As shown in FIG. 2A, the robotic joint 200 may include an upper portion 202, a lower portion 204, and a connecting link 206 positioned between the upper portion 202 and the lower portion 204. The upper portion 202 and lower portion 204 may include carbon fiber material, plastic, metal, or a combination of materials. The robotic joint 200 shown in FIG. 2 represents a knee joint of a legged robotic device, where the upper portion 202 represents a femur and the lower portion 204 represents a combination of a tibia and a fibula. However, other example joints are possible as well, such as an elbow joint or a finger joint, as examples.

Figure 2B:
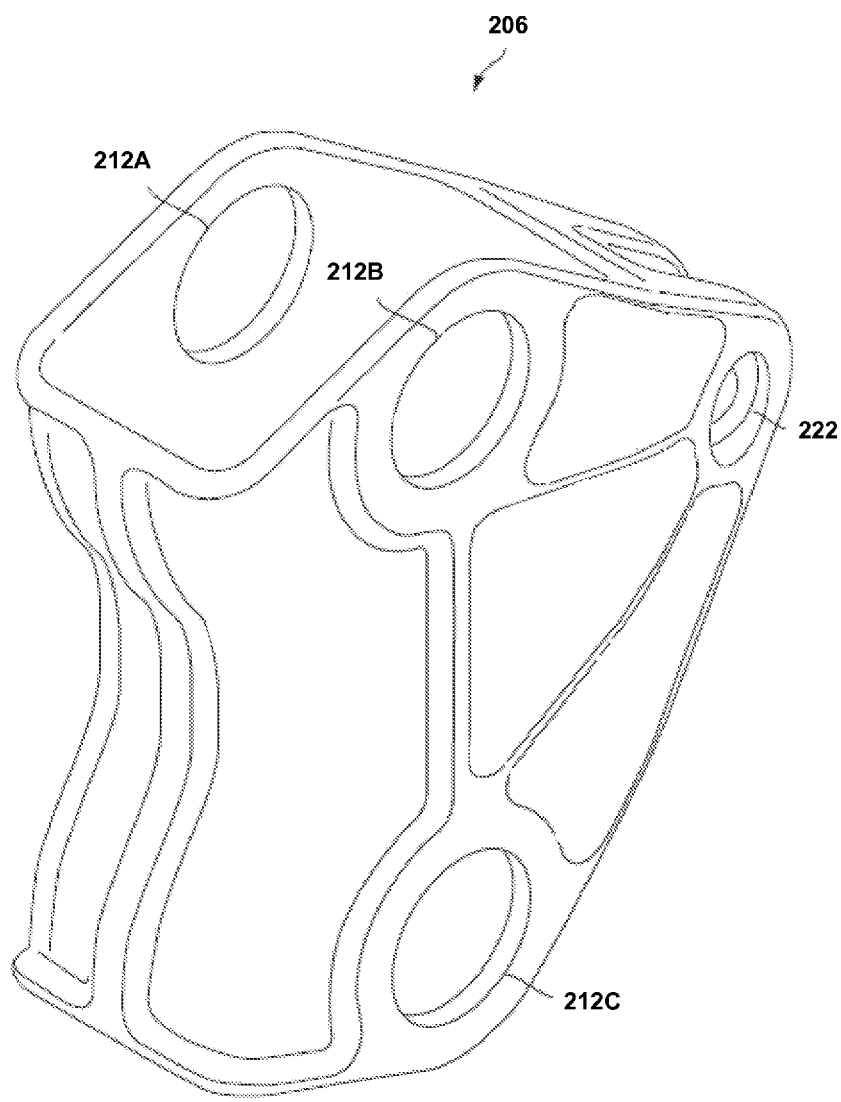
FIG. 2B illustrates an example connecting link, in accordance with at least some embodiments described herein.

The robotic joint 200 may further include a first revolute joint 208 coupling the upper portion 202 to the connecting link 206, and a second revolute joint 210 coupling the lower portion 204 to the connecting link 206. The revolute joints may each be configured to provide a single-axis rotation function with one degree-of-freedom. As shown in FIG. 2A, a distal end of the upper portion 202 may include two holes through the upper portion 202. The connecting link 206 may be positioned inside of a hollow section of the upper portion 202. As shown in FIG. 2B, the connecting link 206 may include two holes 212A, 212B in an upper section of the connecting link 206. These two holes 212A, 212B may be configured to align with the two holes in the distal end of the upper portion 202. The first revolute joint 208 may include a first pin configured to pass through each of the two holes of the upper portion 202 and each of the two holes 212A, 212B of the upper section of the connecting link 206. The first pin may enable the connecting link 206 to rotate about the first revolute joint 208.

Similarly, a proximal end of the lower portion 204 may include two holes through the lower portion 204. The connecting link 206 may be positioned inside of a hollow section of the lower portion 204. As shown in FIG. 2B, the connecting link 206 may include two holes in a lower section of the connecting link 206. FIG. 2B only illustrates a first hole 212C, although a corresponding hole is provided on an opposite side of the connecting link 206. These two holes may be configured to align with the two holes in the proximal end of the lower portion 204. The second revolute joint 210 may include a second pin configured to pass through each of the two holes of the lower portion 204 and each of the two holes of the lower section of the connecting link 206. The second pin may enable the lower portion 204 to rotate about the second revolute joint 210.

In some examples, the robotic joint 200 may further include a cap positioned over a portion of the upper portion 202 and a portion of the lower portion 204. The cap may be U-shaped and include two holes in an upper section of the cap configured to align with the two holes in the distal end of the upper portion 202. The cap may further include two holes in a lower section configured to align with the two holes in the proximal end of the lower portion 204. The cap may be configured to protect the robotic joint 200 from various objects, dirt, or other materials from entering the joint, thereby limiting the movement of the robotic joint 200 or causing damage to the robotic joint 200.

Again with reference to FIG. 2A, the robotic joint 200 may also include one or more holes 214 in a proximal end of the upper portion 202. The one or more holes 214 may be configured for coupling to additional components of the robotic device, such as a hip joint as an example. Similarly, the robotic joint 200 may also include one or more holes 216 in a distal end of the lower portion 204, which may be configured for coupling to additional components of the robotic device, such as an ankle joint as an example.

Figure 2C:
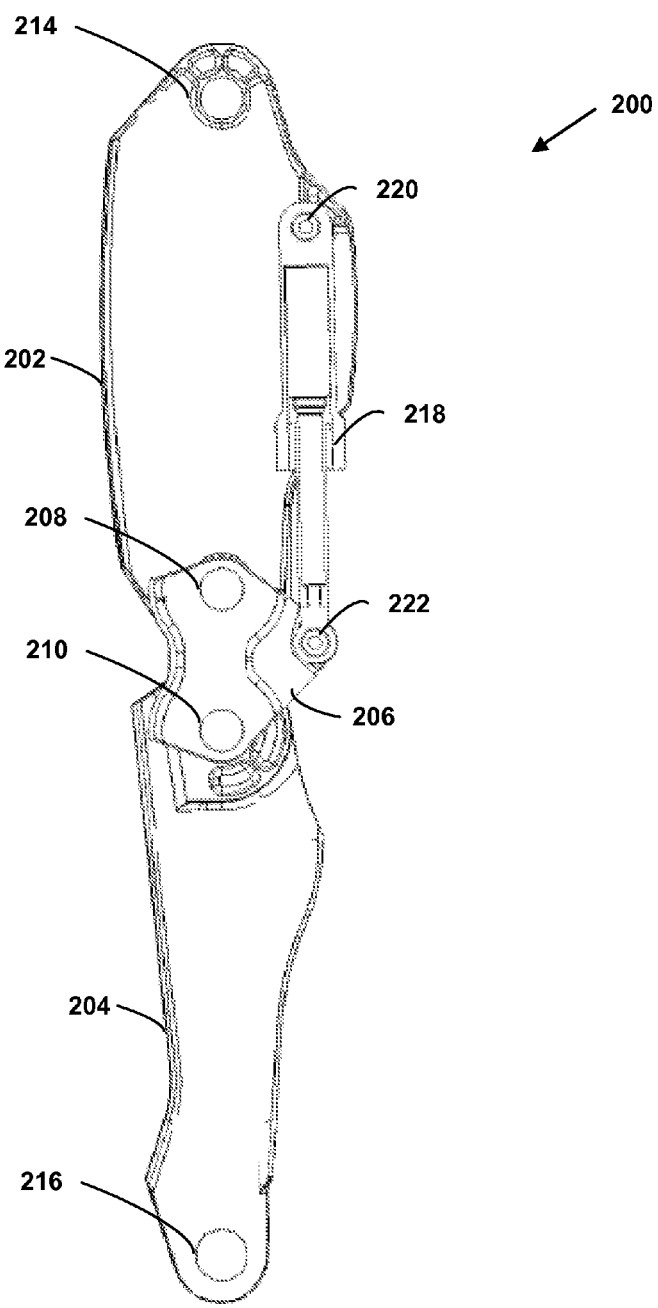
FIG. 2C illustrates a cross-section view of the example robotic joint, in accordance with at least some embodiments described herein.

As shown in FIG. 2A and FIG. 2C, the robotic joint 200 may also include an actuator system 218 having a first end coupled to the upper portion 202, and a second end coupled to the connecting link 206. The actuator system 218 may be configured to apply a torque to the connecting link 206, causing the robotic joint 200 to bend. As shown in FIG. 2A, the upper portion 202 may include a hollow section in which at least a portion of the actuator system 218 may be positioned. The actuator system 218 may include one or more linear hydraulic actuators, or pneumatic actuators, as examples. Other actuators may include one or more of rotary hydraulic actuators, rotary electric actuators, linear electric actuators, and ball screw actuation. Although the robotic joint 200 shown in FIGS. 2A and 2C only include one actuator, the actuator system 218 may include multiple actuators connected in parallel. Other embodiments are possible as well.

As shown in the cross-sectional view of the robotic joint 200 in FIG. 2C, the actuator system 218 may be coupled to the upper portion 202 at a first coupling mechanism 220, and coupled to the connecting link 206 at a second coupling mechanism 222. The second coupling mechanism 222 may include a pin joint, spherical joint, or other mechanism that enables the connecting link 206 to rotate about the second coupling mechanism 222. The first coupling mechanism 220 may include a bolt, rivet or other mechanism that does not enable the actuator system 218 to rotate. In another example, the first coupling mechanism 222 may include a pin joint, spherical joint, or other mechanism that enable the actuator system 218 to rotate. In yet another embodiment, the actuator system 218 may be coupled to the lower portion 204 instead of the upper portion 202. Other examples are possible as well.

The actuator system 218 described above in relation to FIGS. 2A and 2C may be coupled to a hydraulic circuit to assist in various actions. In one example, the hydraulic circuit may be intended to assist in walking. In this example, an example robotic device (such as robotic device 100 in relation to FIG. 1) may include position sensors and pressure sensors to provide joint position and torque data to a controller (e.g., a microprocessor, FPGA, microcontroller, or the like). Based on these inputs and knowledge of typical walking gait cycles, the controller may be programmed to close a valve in the actuator system 218 just prior to heel-strike. At heel-strike, the robotic joint 200 bends and forces fluid in the actuators. In effect, the robotic joint 200 acts like a spring during this phase of the gait cycle, called the "weight acceptance phase". The robotic joint 200 flexes, storing energy in the actuator system 218. Later in stance when the robotic joint 200 extends, pressurized fluid in the actuator system 218 provides an extension force. Late in stance, joint extension velocity goes to zero (as the robotic joint 200 changes direction) and the controller may be programmed to open a valve to allow free flow of fluid in the actuator system 218. This allows the robotic joint 200 to freely flex to provide ground clearance during the swing phase of the gait cycle.

Other hydraulic circuits are possible and can be tailored for other behaviors, such as walking downhill, stair descent, etc. Circuits may also be designed to store energy on descent and use this energy for assisting ascent. Auxiliary power sources such as electric motors or fuel-driven engines can be used to enable sustained climbing, jumping etc. Other sensors such as foot force sensors, accelerometers, electromyography sensors, nerve implants, brain implants, etc. may be used as inputs to a controller which can modulate the force in actuators thus modulating the torque applied by the robotic joint 200.

The robotic joint 200 may further include a coupling element configured to transfer the torque applied to the connecting link 206 via the actuator system 218 into a rotational motion of the lower portion 204 about the second revolute joint 210. The coupling element may take various forms.

Figure 2D:
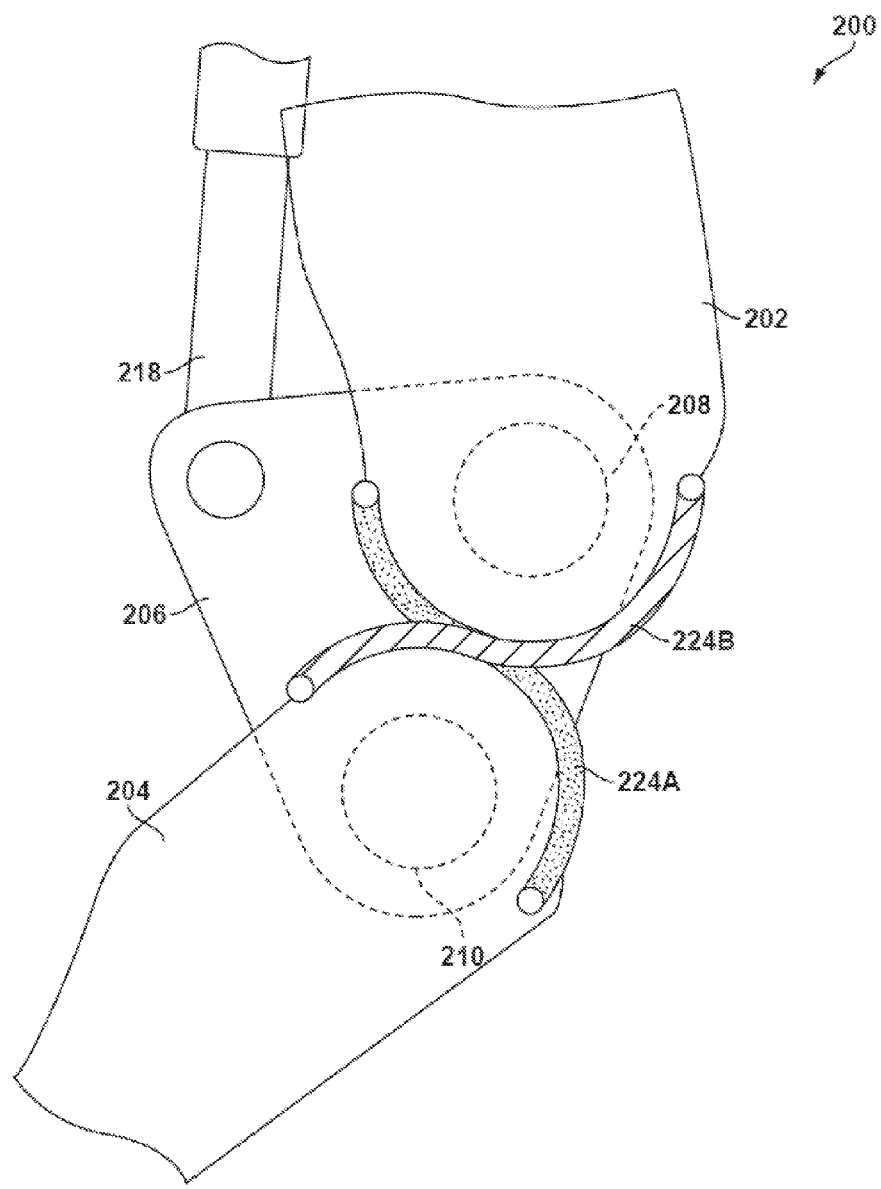
FIGS. 2D and 2E illustrate example coupling elements for an example robotic joint, in accordance with at least some embodiments described herein.

In one example, as shown in FIG. 2D, the coupling element may include a first tensile element 224A having a first end coupled to an inner surface of the upper portion 202 and a second end coupled to an opposite surface of the lower portion 204. The first tensile element 224A may be configured to couple the motion of the lower portion 204 and the connecting link 206 in extension. The coupling element may further include a second tensile element 224B having a first end coupled to an inner surface of the lower portion 204 and a second end coupled to an opposite surface of the upper portion 202. The second tensile element 224B may be configured to couple the motion of the lower portion 204 and the connecting link 206 in flexion.

In another example, the coupling element may include a third tensile element positioned in parallel with the first tensile element, and a fourth tensile element positioned in parallel with the second tensile element. The tensile elements may include one or more of a cable, a chord, a belt, a band or a wire, as examples.

Figure 2E:
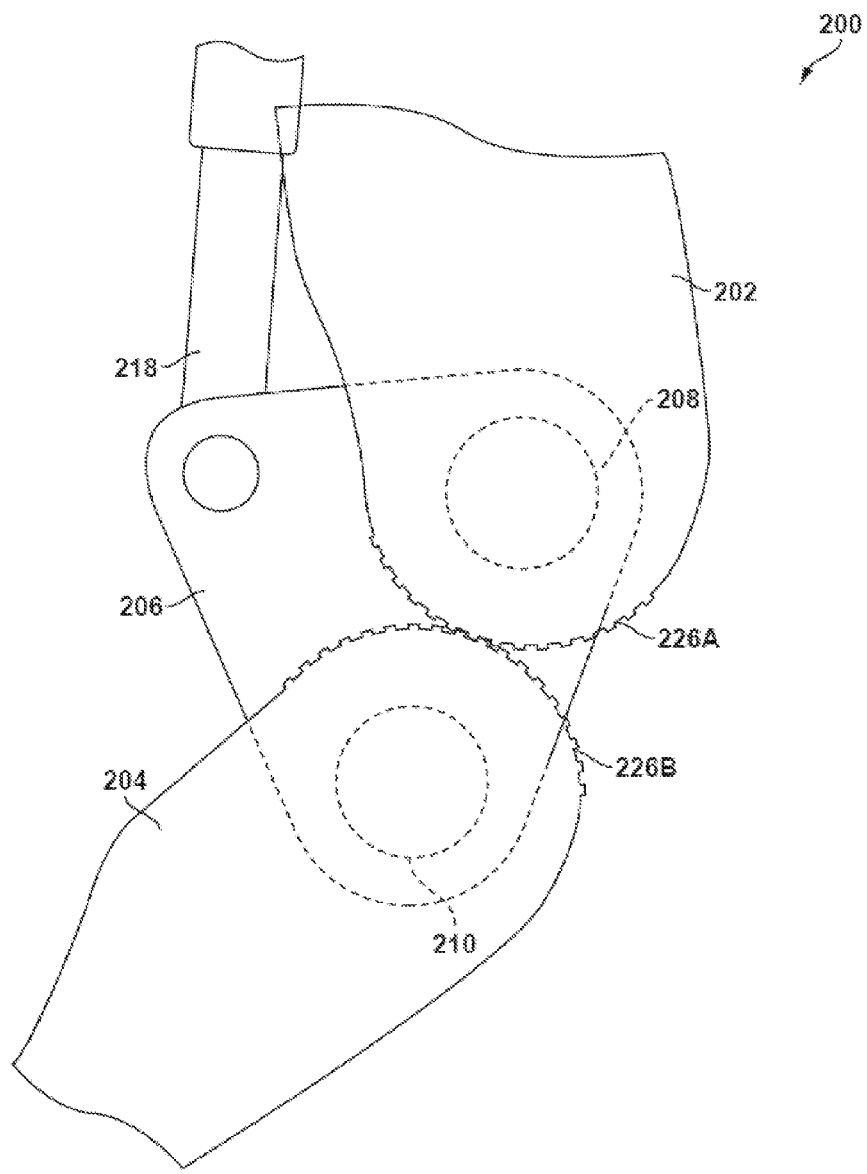

FIG. 2E illustrates yet another example coupling element, according to an example embodiment. As shown in FIG. 2E, the coupling element may include a plurality of gear teeth 226A on the upper portion 202 that are configured to interact with a plurality of gear teeth 226B on the lower portion 204. As the actuator system 218 applies a torque to the connecting link 206, the interaction of the gear teeth 226A, 226B cause the lower portion 204 to rotate about the second revolute joint 210.

Figures 2F, 2G:
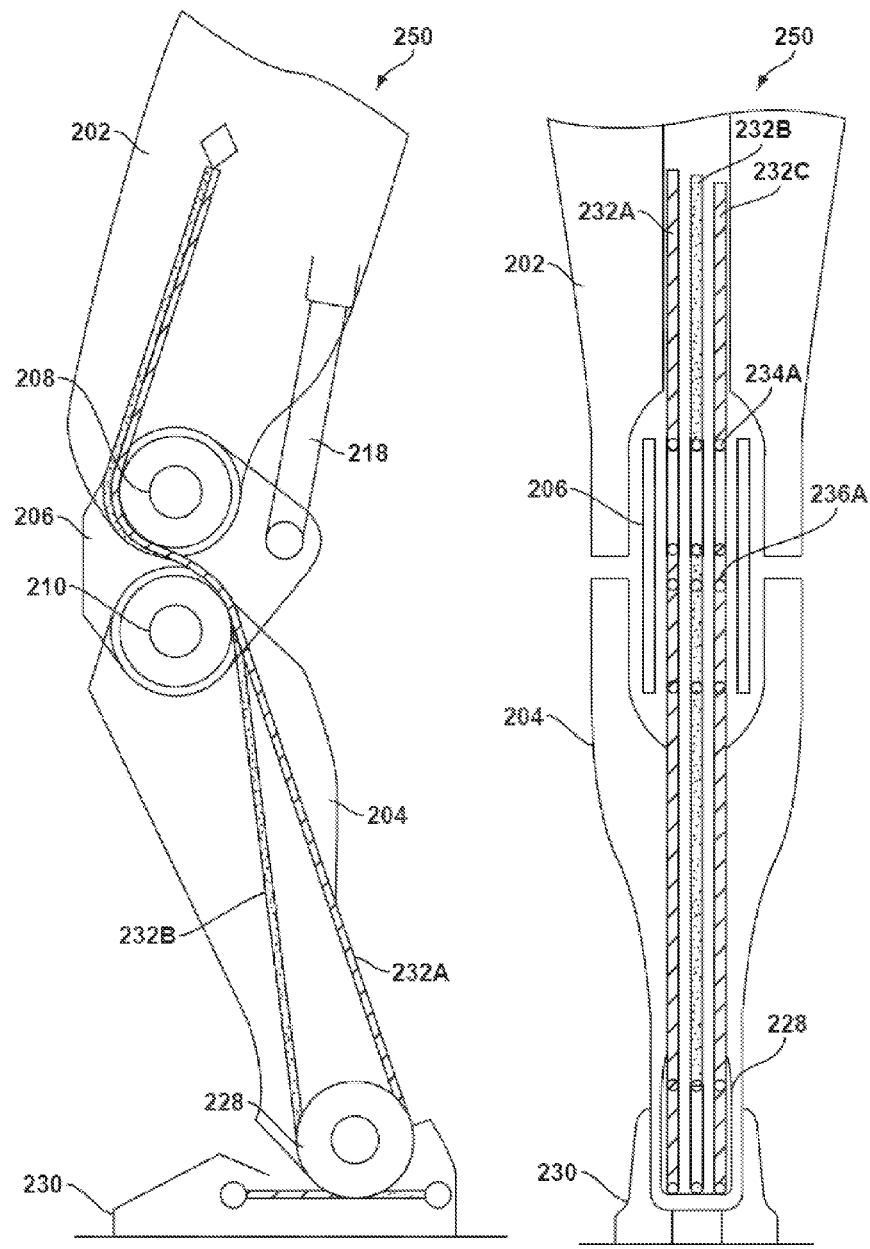
FIGS. 2F and 2G illustrate additional features of the example robotic joint, in accordance with at least some embodiments described herein.

FIGS. 2F and 2G illustrate an additional benefit of the robotic joint 200. The configuration of the robotic joint 200 described above enables various elements to pass through the joint with no length change. In other words, the length of the elements will not change as the joint angle changes. The element may include one or more of a cable, a chord, a belt, a band, a hydraulic hose, a wire, or other electrical components, as examples. Such a configuration enables such elements to pass through active joints to save space in the robotic device. Further, the cables and other elements may be consistently taught since their length does not change, making the sizing of such elements easier and more efficient.

As shown in FIG. 2F, a leg 250 of a robotic device may include, a knee joint 200, and may further include an ankle joint 228 positioned between the lower portion 204 and a robotic foot 230. The leg 250 of the robotic device may further include cables 232A-232C configured to move the ankle joint 228. In one example, the cables 232A-232C may be coupled to an actuator (not shown) positioned in the upper portion 202. The actuator may be configured to pull on the cables 232A-232C to cause the ankle joint 228 to move. The cables 232A-232C may pass through the knee joint 200, and the knee joint 200 may operate independent of the ankle joint 228. As shown in FIG. 2F, the cables 232A-232C pass from a back side of the lower portion 204 to a front side of the upper portion 202. In another example, the cables 232A-232C may pass from the front side of the lower portion 204 to the back side of the upper portion 202. By positioning the actuator in the upper portion 202, the lower portion 204 is lighter, thereby reducing the leg inertia about the hip. In such a configuration, less torque is required to cause the lower portion 204 to rotate.

Further, as shown in FIG. 2G, the leg 250 may include a first pulley 234 coupled to the connecting link 206 via the first revolute joint 208. The leg 250 may further include a second pulley 236 coupled to the connecting link 206 via the second revolute joint 210. As discussed above, an element may be configured to contact a first surface of the first pulley and an opposite surface of the second pulley, such that the element passes through the active knee joint 200. In such a configuration, the length of the element remains constant throughout the rotational motion of the connecting link 206 about the first revolute joint 208 and the rotational motion of the lower portion 204 about the second revolute joint 210.

The pulleys 234, 236 may have various configurations. In one example, the pulleys 234, 236 may be rotating pulleys that rotate around the first and second revolute joints 208, 210 as an element moves over the pulley. In another example, the pulleys 234, 236 may be fixed pulleys with a low-friction surface configured to enable the element to slide over the pulley.

As shown in FIG. 2G, the first pulley 234 and the second pulley 236 may include multiple sections to accommodate a plurality of elements, such as cables, chords, belts, bands, hydraulic hoses, wires, or other electrical components, as examples. In one example, each of the multiple sections may be a part of a single pulley. In such an example, the each of the multiple sections may rotate in unison. In another example, the leg 250 may include a plurality of pulleys in parallel with the first pulley 234, and a plurality of pulleys in parallel with the second pulley 236. In such a configuration, each pulley may operate independent of one another.

In operation, the robotic joint 200 may begin in an extended position, as shown in FIG. 2A. The actuator system 218 may then retract, thereby applying a flexion torque to the connecting link 206. As the actuator system 218 continues to retract, the flexion torque applied to the connecting link 206 causes the connecting link 206 to rotate about the first revolute joint 208. In addition, the coupling element transfers the flexion torque applied to the connecting link 206 into a rotational motion of the lower portion 204 about the second revolute joint 210. As discussed above, the coupling element may include two or more tensile elements, or a plurality of interacting gear teeth, among other examples. When the robotic joint 200 is at full bend, the actuator system 218 may extend, thereby applying an extension torque to the connecting link 206. As the actuator system 218 continues to extend, the extension torque applied to the connecting link 206 causes connecting link 206 to rotate about the first revolute joint 208. In addition, the coupling element transfers the extension torque applied to the connecting link 206 into a rotational motion of the lower portion 204 about the second revolute joint 210.

Such a configuration enables the robotic joint 200 to have a range of motion of approximately one hundred and eighty degrees. Further, the ratio of an angular velocity of the connecting link about the first revolute joint and an angular velocity of the lower portion about the second revolute joint is constant across the motion of the robotic joint 200, meaning a similar input at any joint angle results in a similar output. A constant ratio of angular velocities between joint components enables the actuator system 218 to be sized reasonably for a particular use case. In addition, the axis of rotation of the robotic joint 200 may be in line with the midline of the two revolute joints 208, 210. Such a configuration enables the upper portion 202 and the lower portion 204 to be positioned in line with each other along a common midline when the robotic joint 200 is fully extended, and fold up completely when the robotic joint 200 is at full bend.

As shown in FIG. 2A, the distal end of the upper portion 202 and the proximal end of the lower portion 204 may include a rounded surface. In one example, the rotational motion of the lower portion 204 about the second revolute joint 210 may cause a rolling contact between the rounded surface of the upper portion 202 and the rounded surface of the lower portion 204. In another example, the upper portion 202 and the lower portion 204 may be separated by a separation distance such that the upper portion 202 does not contact the lower portion 204.

As discussed above, an example robotic device may further include a load cell provide proximal to the robotic joint 200. The load cell may be configured to detect a force applied to the robotic device and the torque applied to the connecting link 206. The robotic device may further include a controller programmable to determine a location of the detected force based on values of the force and the torque output from the load cell. The controller may responsively cause the actuator system 218 to adjust the torque applied to the connecting link 206 based on the determined location of the detected force.

Figure 3:
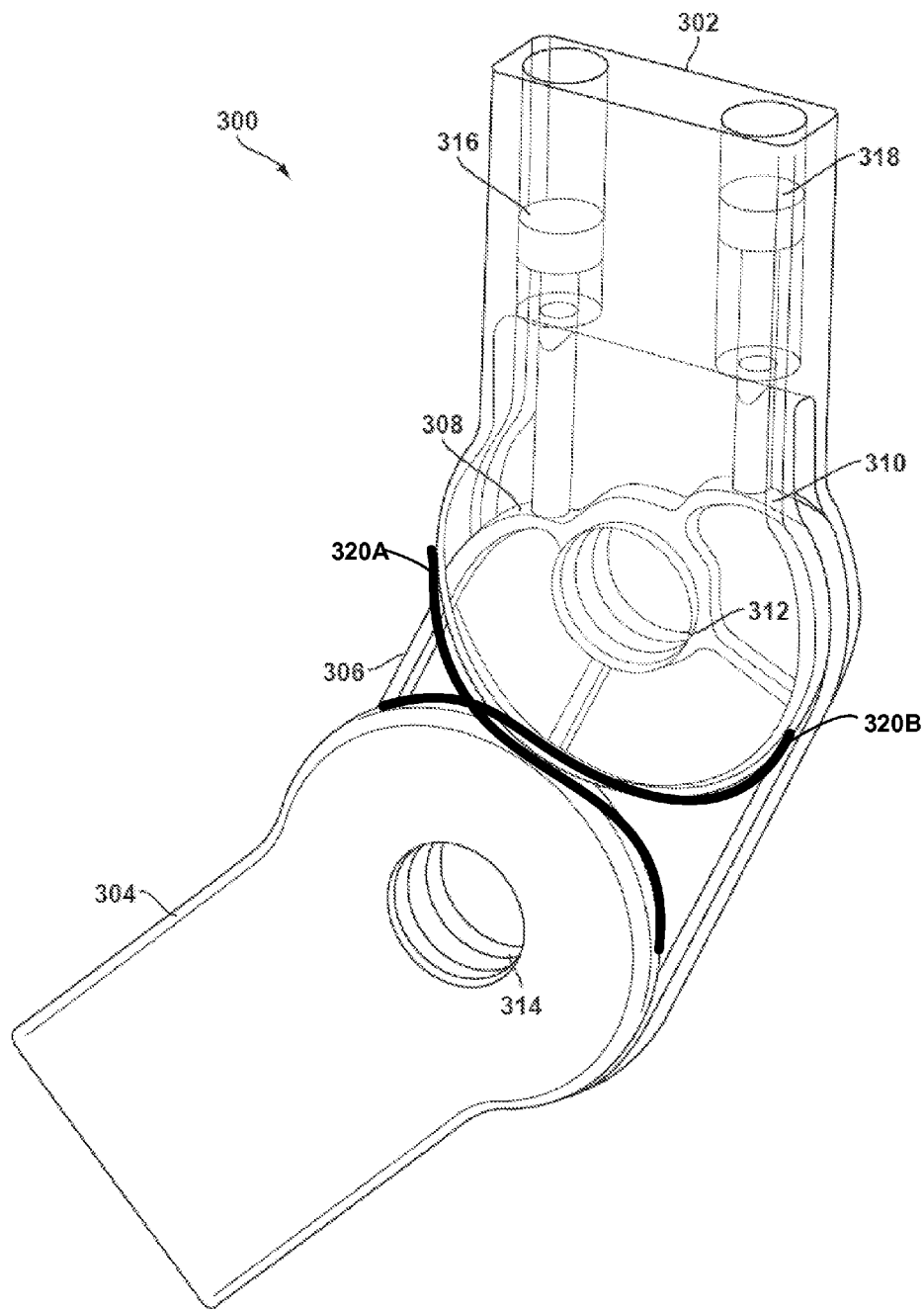
FIG. 3 illustrates another example robotic joint, in accordance with at least some embodiments described herein.

FIG. 3 illustrates another example robotic joint 300, according to an example embodiment. The robotic joint 300 may represent a knee joint, an elbow joint, or a finger joint, as examples. The robotic joint 300 may include an upper portion 302, a lower portion 304, and a connecting link 306 positioned between the upper portion 302 and the lower portion 304. The connecting link may include a first cam surface 308 and a second cam surface 310. The upper portion 302 and lower portion 304 may include carbon fiber material, plastic, metal, or a combination of materials. The robotic joint 300 may further include a first revolute joint 312 coupling the upper portion 302 to the connecting link 306, and a second revolute joint 314 coupling the lower portion 304 to the connecting link 306.

The robotic joint 300 may further include a first actuator 316 coupled to the upper portion 302, and the first actuator 316 may be configured to contact the first cam surface 308 to apply a first torque to the connecting link 306. In one example, the first torque comprises an extension torque, such that the extension torque causes the robotic joint 300 to move to an extended position. The first torque applies a rotational motion of the connecting link 306 about the first revolute joint 312. The robotic joint 300 may also include a second actuator 318 coupled to the upper portion 302, and the second actuator 318 may be configured to contact the second cam surface 310 to apply a second torque to the connecting link 306. In one example, the second torque comprises a flexion torque, such that the flexion torque causes the robotic joint 300 to move to a bent position. The second torque applies a rotational motion of the connecting link 306 about the first revolute joint 312. In yet another embodiment, the actuators 316, 318 may be coupled to the lower portion 304 instead of the upper portion 302. Other examples are possible as well.

The robotic joint 300 may further include a coupling element configured to transfer the torque applied to the connecting link 306 via the actuators 316, 318 into a rotational motion of the lower portion 304 about the second revolute joint 314. As discussed above, the coupling element may take various forms. As shown in FIG. 3, the coupling element may include the coupling element may include a first tensile element 320A having a first end coupled to an inner surface of the upper portion 302 and a second end coupled to an opposite surface of the lower portion 304. The first tensile element 320A may be configured to couple the motion of the lower portion 304 and the connecting link 306 in extension. The coupling element may further include a second tensile element 320B having a first end coupled to an inner surface of the lower portion 304 and a second end coupled to an opposite surface of the upper portion 302. The second tensile element 320B may be configured to couple the motion of the lower portion 304 and the connecting link 306 in flexion. In another example, the coupling element may include a plurality of interacting gear teeth on the upper portion 302 and the lower portion 304. Further, as discussed above, the distal end of the upper portion 302 and the proximal end of the lower portion 304 may include a rounded surface. In one example, the rotational motion of the lower portion 304 about the second revolute joint 314 may cause a rolling contact between the rounded surface of the upper portion 302 and the rounded surface of the lower portion 304. In another example, the upper portion 302 and the lower portion 304 may be separated by a separation distance such that the upper portion 302 does not contact the lower portion 304.

Similar to the robotic joint 200 described above, the configuration of the robotic joint 300 enables various elements to pass through the joint with no length change. In other words, the length of the elements will not change as the joint angle changes. The element may include one or more of a cable, a chord, a belt, a band, a hydraulic hose, a wire, or other electrical components, as examples. Such a configuration enables such elements to pass through active joints to save space in the robotic device. Further, the cables and other elements may be consistently taught since their length does not change, making the sizing of such elements easier and more efficient. In one example, such elements may be coupled to an actuator (not shown) positioned in the upper portion 302. The actuator may be configured to pull on the elements to cause an ankle joint (not shown) to move. By positioning the actuator in the upper portion 302, the lower portion 304 is lighter, thereby reducing the leg inertia about the hip. In such a configuration, less torque is required to cause the lower portion 304 to rotate.

In operation, the robotic joint 300 may begin in an extended position. The second actuator 318 may then extend, causing the second actuator 318 to contact the second cam surface, thereby applying a flexion torque to the connecting link 306. As the second actuator 318 continues to retract, the connecting link 306 begins to rotate about the first revolute joint 312. In addition, the coupling element transfers the flexion torque applied to the connecting link 306 into a rotational motion of the lower portion 304 about the second revolute joint 314. When the robotic joint 300 is at full bend, the first actuator 316 may extend, thereby applying an extension torque to the connecting link 306. As the first actuator 316 continues to extend, the connecting link 306 begins to rotate about the first revolute joint 312. In addition, the coupling element transfers the extension torque applied to the connecting link 306 into a rotational motion of the lower portion 304 about the second revolute joint 314.

Similar to the configuration described above in relation to FIGS. 2A-2G, the robotic joint 300 has a range of motion of approximately one hundred and eighty degrees. Further, the ratio of an angular velocity of the connecting link about the first revolute joint and an angular velocity of the lower portion about the second revolute joint is constant across the motion of the robotic joint 300, meaning a similar input at any joint angle results in a similar output. A constant ratio of angular velocities between joint components enables the actuators 316, 318 to be sized reasonably for a particular use case. In addition, the axis of rotation of the robotic joint 300 may be in line with the midline of the two revolute joints 312, 314. Such a configuration enables the upper portion 302 and the lower portion 304 to be positioned in line with each other along a common midline when the robotic joint 300 is fully extended, and fold up completely when the robotic joint 300 is at full bend.

Figure 4:
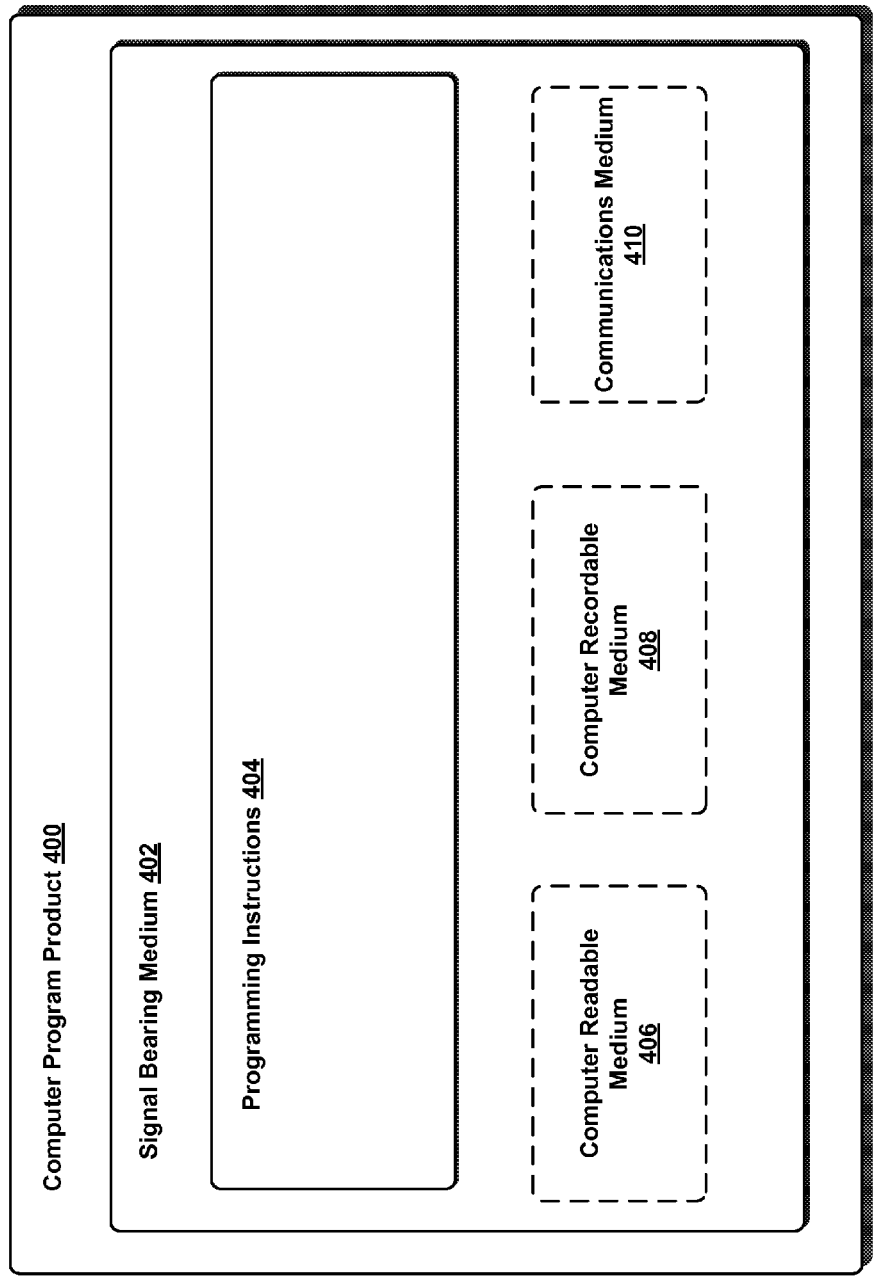
FIG. 4 depicts a computer-readable medium configured according to an example embodiment.

FIG. 4 illustrates a computer-readable medium configured according to an example embodiment. In example embodiments, the example robotic device can include one or more processors, one or more forms of memory, one or more input devices/interfaces, one or more output devices/interfaces, and machine-readable instructions that when executed by the one or more processors cause the system to carry out the various functions, tasks, capabilities, etc., described above.

As noted above, in some embodiments, the disclosed robotic joints can perform actions that may be implemented by computer program instructions encoded on a non-transitory computer-readable storage media in a machine-readable format, or on other non-transitory media or articles of manufacture. FIG. 4 is a schematic illustrating a conceptual partial view of an example computer program product that includes a computer program for executing a computer process on a computing device, arranged according to at least some embodiments presented herein.

In one embodiment, the example computer program product 400 is provided using a signal bearing medium 402. The signal bearing medium 402 may include one or more programming instructions 404 that, when executed by one or more processors may provide functionality or portions of the functionality described above with respect to FIGS. 1-2G. In some examples, the signal bearing medium 402 can be a computer-readable medium 406, such as, but not limited to, a hard disk drive, a Compact Disc (CD), a Digital Video Disk (DVD), a digital tape, memory, etc. In some implementations, the signal bearing medium 402 can be a computer recordable medium 408, such as, but not limited to, memory, read/write (R/W) CDs, R/W DVDs, etc. In some implementations, the signal bearing medium 402 can be a communications medium 410, such as, but not limited to, a digital and/or an analog communication medium (e.g., a fiber optic cable, a waveguide, a wired communications link, a wireless communication link, etc.). Thus, for example, the signal bearing medium 402 can be conveyed by a wireless form of the communications medium 410.

The one or more programming instructions 404 can be, for example, computer executable and/or logic implemented instructions. In some examples, a computing device such as the processor 118 of FIG. 1 is configured to provide various operations, functions, or actions in response to the programming instructions 404 conveyed to the processor 118 by one or more of the computer-readable medium 406, the computer recordable medium 408, and/or the communications medium 410.

The non-transitory computer-readable medium 408 could also be distributed among multiple data storage elements, which could be remotely located from each other. The device that executes some or all of the stored instructions could be a client-side computing device. Alternatively, the device that executes some or all of the stored instructions could be a server-side computing device.

Within some examples herein, operations may be described as methods for performing functions, and methods may be embodied on a computer program product (e.g., a tangible computer readable storage medium or non-transitory computer readable medium) that includes instructions executable to perform the functions.

Figure 5:
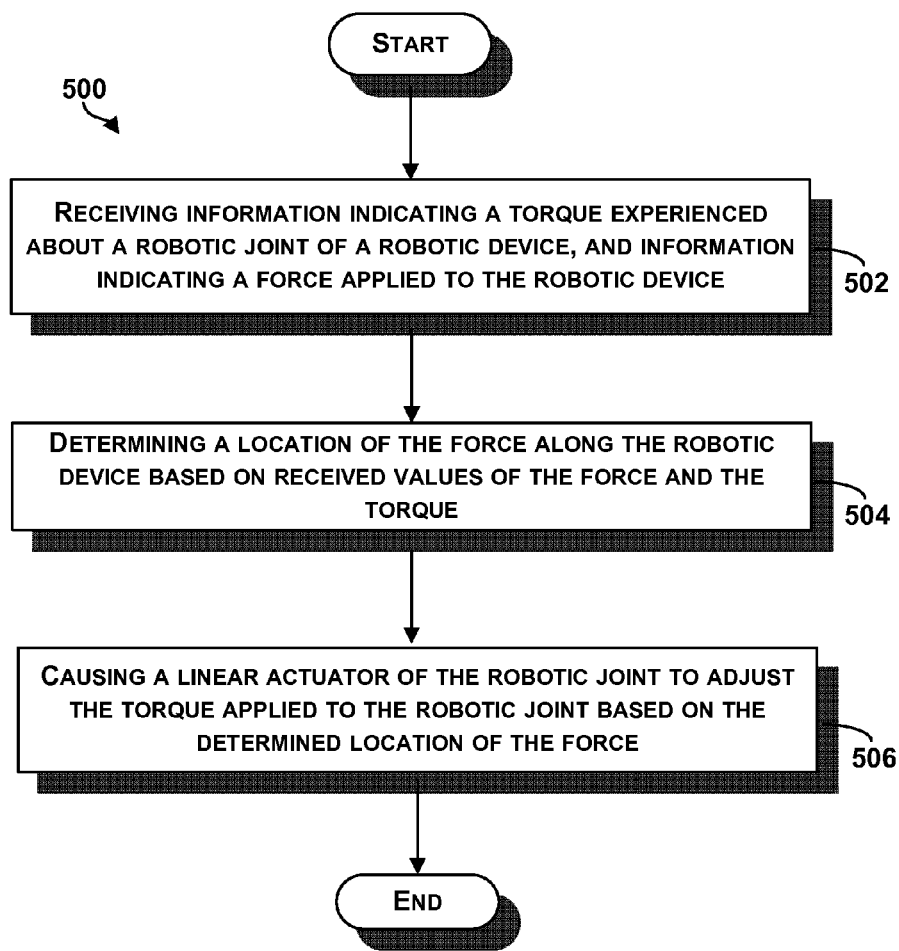
FIG. 5 is a flowchart illustrating an example method for operating a robotic device.

FIG. 5 is a flowchart illustrating an example method 500 for operating a robotic device. The method 500 may be embodied as computer executable instructions stored on non-transitory media, such as the configuration described above in relation to FIG. 4, for example. At block 502, the method 500 includes receiving information indicating a torque experienced about a robotic joint of a robotic device, and information indicating a force applied to the robotic device. The information may indicate values of the force and the torque along all three Cartesian coordinate axes X, Y, and Z. The information may be received from a load cell provided proximal to the joint, for example. At block 504, the method 500 includes determining a location of the force along the robotic device based on received values of the force and the torque. The location of the force along the robotic device may be determined as a distance away from the load cell, for example. At block 506, the method 500 includes causing a linear actuator of the robotic joint to adjust the torque applied to the robotic joint based on the determined location of the force.

The robotic device 100 described in FIG. 1 and the robotic joints described in FIGS. 2A-3 above may be used in many implementations of the described method.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:
1. A robotic joint comprising:
an upper portion;
a lower portion;
a connecting link positioned between the upper portion and the lower portion;
a first revolute joint coupling the upper portion to the connecting link;
a second revolute joint coupling the lower portion to the connecting link;
an actuator system having a first end coupled to the upper portion and a second end coupled to the connecting link, wherein the actuator system is configured to apply a torque to the connecting link such that the torque applies a rotational motion of the connecting link about the first revolute joint; and
a coupling element configured to transfer the torque applied to the connecting link into a rotational motion of the lower portion about the second revolute joint, wherein a ratio of an angular velocity of the connecting link about the first revolute joint and an angular velocity of the lower portion about the second revolute joint is constant across a range of the robotic joint, and wherein the coupling element comprises:
a first tensile element having a first end coupled to an inner surface of the upper portion and a second end coupled to an opposite surface of the lower portion, wherein the first tensile element couples the motion of the lower portion and the connecting link in extension, and
a second tensile element having a first end coupled to an inner surface of the lower portion and a second end coupled to an opposite surface of the upper portion, wherein the second tensile element couples the motion of the lower portion and the connecting link in flexion.

2. The robotic joint of claim 1, wherein the coupling element further comprises:
a third tensile element having a first end coupled to the inner surface of the upper portion and a second end coupled to the opposite surface of the lower portion, wherein the third tensile element couples the motion of the lower portion and the connecting link in extension; and
a fourth tensile element having a first end coupled to the inner surface of the lower portion and a second end coupled to the opposite surface of the upper portion, wherein the fourth tensile element couples the motion of the lower portion and the connecting link in flexion.

3. The robotic joint of claim 1, wherein the coupling element further comprises:
a plurality of gear teeth on the upper portion configured to interact with a plurality of gear teeth on the lower portion.

4. The robotic joint of claim 1, wherein the actuator system includes one or more linear hydraulic actuators.

5. The robotic joint of claim 1, wherein the upper portion and the lower portion are positioned in line with each other along a common midline when the robotic joint is in a fully extended position.

6. The robotic joint of claim 1, wherein the upper portion includes a hollow section, and wherein the actuator system is positioned inside of the hollow section.

7. The robotic joint of claim 1, further comprising:
an element configured to pass from a first side of the upper portion to an opposite side of the lower portion, wherein a length of the element remains constant throughout the rotational motion of the connecting link about the first revolute joint and the rotational motion of the lower portion about the second revolute joint.

8. The robotic joint of claim 7, further comprising:
a first pulley coupled to the connecting link via the first revolute joint; and
a second pulley coupled to the connecting link via the second revolute joint, wherein the element is configured to contact a first surface of the first pulley and an opposite surface of the second pulley.

9. The robotic joint of claim 7, wherein the element comprises one of a cable, a chord, a belt, a band, a hose or a wire.

10. The robotic joint of claim 1, wherein the ratio of the angular velocity of the connecting link about the first revolute joint and the angular velocity of the lower portion about the second revolute joint is 1:1.

11. The robotic joint of claim 1, wherein the ratio of the angular velocity of the connecting link about the first revolute joint and the angular velocity of the lower portion about the second revolute joint is 2:1.

12. A robotic device comprising:
a body;
one or more joints coupled to the body, wherein the one or more joints include:
an upper portion;
a lower portion;
a connecting link positioned between the upper portion and the lower portion;
a first revolute joint coupling the upper portion to the connecting link;
a second revolute joint coupling the lower portion to the connecting link;
a linear actuator having a first end coupled to the upper portion and a second end coupled to the connecting link, wherein the linear actuator is configured to apply a torque to the connecting link such that the torque applies a rotational motion of the connecting link about the first revolute joint; and
a coupling element configured to transfer the torque applied to the connecting link into a rotational motion of the lower portion about the second revolute joint, wherein a ratio of an angular velocity of the connecting link about the first revolute joint and an angular velocity of the lower portion about the second revolute joint is constant across a range of the one or more joints;
a load cell provided proximal to a given joint of the one or more joints for detecting a force applied to the robotic device and the torque applied to the connecting link; and
a controller programmable to determine a location of the detected force along the robotic device based on values of the force and the torque output from the load cell and responsively cause the linear actuator to adjust the torque applied to the connecting link based on the determined location of the detected force.

13. The robotic device of claim 12, wherein the coupling element comprises:
a first tensile element having a first end coupled to an inner surface of the upper portion and a second end coupled to an opposite surface of the lower portion, wherein the first tensile element couples the motion of the lower portion and the connecting link in extension; and
a second tensile element having a first end coupled to an inner surface of the lower portion and a second end coupled to an opposite surface of the upper portion, wherein the second tensile element couples the motion of the lower portion and the connecting link in flexion.

14. The robotic device of claim 12, wherein the coupling element comprises:
a plurality of gear teeth on the upper portion configured to interact with a plurality of gear teeth on the lower portion.

15. The robotic device of claim 12, wherein each of the one or more joints further includes:
an element configured to pass from a first side of the upper portion to an opposite side of the lower portion, wherein a length of the element remains constant throughout the rotational motion of the connecting link about the first revolute joint and the rotational motion of the lower portion about the second revolute joint.

16. A robotic joint comprising:
an upper portion;
a lower portion;
a connecting link positioned between the upper portion and the lower portion, wherein the connecting link includes a first cam surface and a second cam surface;
a first revolute joint coupling the upper portion to the connecting link;
a second revolute joint coupling the lower portion to the connecting link;
a first actuator coupled to the upper portion, wherein the first actuator is configured to contact the first cam surface to apply a first torque to the connecting link such that the first torque applies a rotational motion of the connecting link about the first revolute joint in a first direction;

a second actuator coupled to the upper portion, wherein the second actuator is configured to contact the second cam surface to apply a second torque to the connecting link such that the second torque applies a rotational motion of the connecting link about the first revolute joint in a second direction; and a coupling element configured to transfer the first torque and the second torque applied to the connecting link into a rotational motion of the lower portion about the second revolute joint, wherein a ratio of an angular velocity of the connecting link about the first revolute joint and an angular velocity of the lower portion about the second revolute joint is constant across a range of the robotic joint.

17. The robotic joint of claim 16, wherein the first torque comprises an extension torque, and wherein the second torque comprises a flexion torque.

18. The robotic joint of claim 16, further comprising:
an element configured to pass from a first side of the upper portion to an opposite side of the lower portion, wherein a length of the element remains constant throughout the rotational motion of the connecting link about the first revolute joint and the rotational motion of the lower portion about the second revolute joint.

19. A robotic joint comprising:
an upper portion including a hollow section;
a lower portion;
a connecting link positioned between the upper portion and the lower portion;
a first revolute joint coupling the upper portion to the connecting link;
a second revolute joint coupling the lower portion to the connecting link;
an actuator system having a first end coupled to the lower portion and a second end coupled to the connecting link, wherein the actuator system is configured to apply a torque to the connecting link such that the torque applies a rotational motion of the connecting link about the second revolute joint, and wherein the actuator system is positioned inside of the hollow section of the upper portion; and a coupling element configured to transfer the torque applied to the connecting link into a rotational motion of the upper portion about the first revolute joint, wherein a ratio of an angular velocity of the connecting link about the first revolute joint and an angular velocity of the lower portion about the second revolute joint is constant across a range of the robotic joint.

20. A robotic joint comprising:
an upper portion;
a lower portion;
a connecting link positioned between the upper portion and the lower portion, wherein the connecting link includes a first cam surface and a second cam surface;
a first revolute joint coupling the upper portion to the connecting link;
a second revolute joint coupling the lower portion to the connecting link;
a first actuator coupled to the lower portion, wherein the first actuator is configured to contact the first cam surface to apply a first torque to the connecting link such that the first torque applies a rotational motion of the connecting link about the second revolute joint in a first direction;
a second actuator coupled to the lower portion, wherein the second actuator is configured to contact the second cam surface to apply a second torque to the connecting link such that the second torque applies a rotational motion of the connecting link about the second revolute joint in a second direction; and
a coupling element configured to transfer the first torque and the second torque applied to the connecting link into a rotational motion of the upper portion about the first revolute joint, wherein a ratio of an angular velocity of the connecting link about the first revolute joint and an angular velocity of the lower portion about the second revolute joint is constant across a range of the robotic joint.

* * * * *